United States Patent [19]

DeMaster

[11] 4,061,268

[45] Dec. 6, 1977

[54] TRACTION MAT

[75] Inventor: Robert D. DeMaster, Afton, Minn.

[73] Assignee: Minnesota Mining and Manufacturing Company, St. Paul, Minn.

[21] Appl. No.: 636,581

[22] Filed: Dec. 1, 1975

[51] Int. Cl.² ............................................. E01B 23/00
[52] U.S. Cl. ..................................... 238/14; 106/36; 428/372
[58] Field of Search .................... 238/3, 14; 152/208; 180/5 R, 5 A; 51/404, DIG. 22; 106/36; 428/241, 372

[56] References Cited

U.S. PATENT DOCUMENTS

| | | | |
|---|---|---|---|
| 2,740,239 | 4/1956 | Ball et al. | 51/404 |
| 2,984,052 | 5/1961 | Mueller, Jr. | 51/404 |
| 3,202,358 | 8/1965 | Griswold | 238/14 |
| 3,790,431 | 2/1974 | Tung | 428/241 |

FOREIGN PATENT DOCUMENTS 719,616  10/1965  Canada .................................. 238/14

Primary Examiner—Robert J. Spar
Assistant Examiner—Randolph A. Reese
Attorney, Agent, or Firm—Cruzan Alexander; Donald M. Sell; Roger R. Tamte

[57] ABSTRACT

A mat useful, inter alia, to provide traction under the wheels of a vehicle comprises an open-mesh net of strands that are encased around their individual circumferences with a frictional coating that comprises a layer of binder material adhered to the strand and a monolayer of abrasive granules partially embedded in the layer of binder material.

8 Claims, 4 Drawing Figures

TRACTION MAT

Motorists unable to move from a spot at which they have stopped on an icy or snow-covered surface often try to insert a sheet-type article under the wheels of their vehicle. A variety of articles have been used for this purpose, including sheets of cardboard, carpeting, lumber, and metal (such as sheets of expanded, perforated metal), but their performance is generally quite erratic; often the inserted article is thrown from under the wheels without movement of the vehicle and to the danger of any bystanders. In addition, such sheet-type articles are often inconvenient to obtain or use; few persons carry such an article in their vehicle because of the bulk, disorder, and dirtiness they cause.

The present invention provides a new article that has unique traction properties, is convenient to use, and can be conveniently stored in a vehicle trunk before and after use. Briefly, this new traction mat comprises an open-mesh net of strands that are encased around their individual circumferences with a frictional coating that comprises a layer of flexible elastic binder material adhered to the strands and a dense monolayer of abrasive granules partially embedded in the binder material and partially protruding above the binder material so as to frictionally engage a surface against which the mat is laid.

When a mat as described is laid on a slippery surface, it frictionally engages both the slippery surface and the wheel of a vehicle driven over it. Further, because of its open nature and the extension of the frictional coating around the circumference of the strand, very good gripping forces are achieved. The mat has superior ability to remain in place when the vehicle's wheels are set in motion, and the mat provides good traction for the wheels. Once the mat has been used, and after shaking any accumulated ice, snow, or dirt from the mat, it can be conveniently rolled into a compact roll and stored in a pouch. The mat does not permanently deform upon use, but may be used repeatedly, and conveniently stored between uses.

Related Prior Art

Commercial rubber overshoes have been previously made slip-resistant by coating them with materials that may also be used to form the frictional coating in mats of the invention. Such overshoes are clearly different from traction mats of the invention: the substrate on which the material is coated is continuous in nature, rather than open-mesh; and the overshoe does not have the encased, or "front-and-back," frictional characteristics of mats of the invention. The prior use of the described frictional materials in no way suggests traction mats of the invention, nor do such uses predict the utility which mats of the invention have been found to have.

Abrasive sheet materials useful in sanding or finishing operations have been previously made from open-mesh fabrics; see Anderson, U.S. Pat. No. 2,123,581, and Ball, U.S. Pat. Nos. 2,740,239 and 2,740,725. However, these products generally have rather small openings and they use rather rigid binder materials such as phenol-formaldehyde condensation products. Because of their small openings, the prior products would not achieve the full engagement with underlying substrates that is achieved by a traction mat of the invention; and snow packed into the openings would be difficult to remove. Insofar as known, the prior abrasive products have not been suggested for use as traction mats, and they would not have the utility for such a purpose exhibited by traction mats of the invention.

The open-mesh retroreflective sheeting taught in Tung, U.S. Pat. No. 3,790,431 is also essentially different from products of the present invention. In this prior product, glass microspheres instead of abrasive granules are adhered to an open-mesh sheeting; and the openings in the sheeting are small openings dimensioned to provide high levels of retroreflection while still permitting transmission of light through the sheeting.

DETAILED DESCRIPTION

Figure 1:
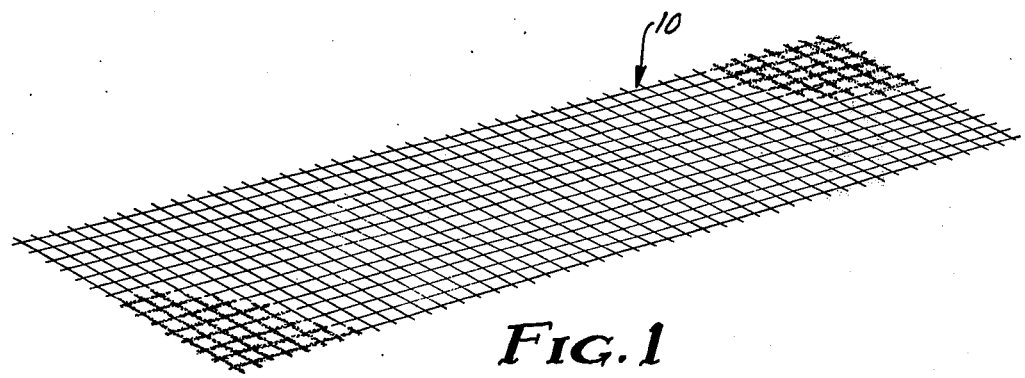
FIG. 1 is a perspective view of an illustrative traction mat of the invention.
Figure 2:
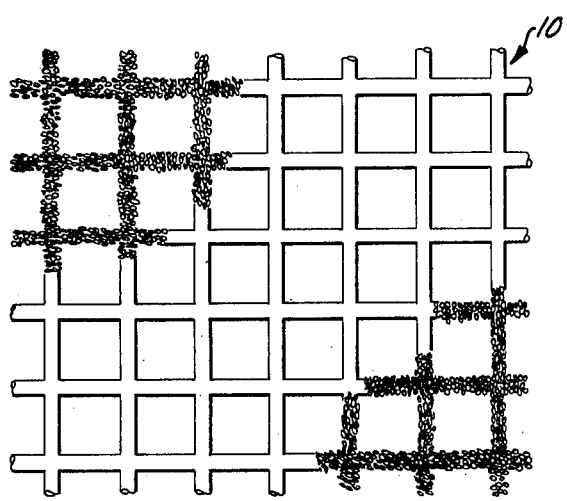
FIGS. 2 and 3 are enlarged top views of portions of traction mats of the invention.
Figure 3:
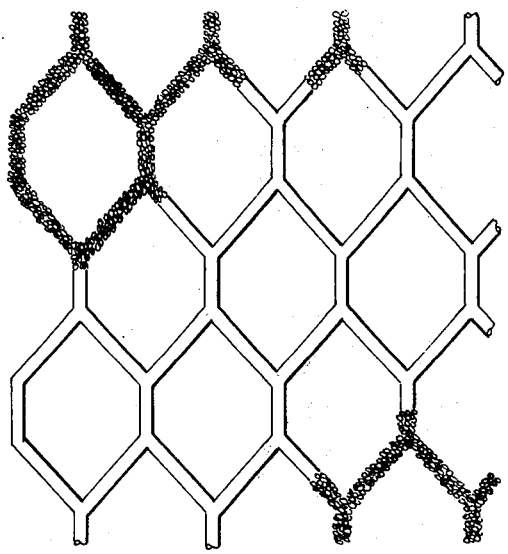

The perspective view of a traction mat of the invention 10 shown in FIG. 1 illustrates the net-like or open-mesh structure of the mat. The mat may have various patterns, two of which are shown in FIGS. 2 and 3. As a result of the open-mesh structure, as indicated above, the mat may be easily cleaned of snow and ice that collect on it; the mat is more flexible; and a greater part of a surface pressed against the mat will engage the frictional coating on the strands of the mat. For best results the mesh is sufficiently open so that the average area of the openings is at least 50 square millimeters, and more preferably at least 100 square millimeters, but is less than 2500, and preferably less than 1000 square millimeters.

A mat of the invention can conveniently be made by coating a base open-mesh net with a binder material, as by dipping, spraying, brushing, or extruding, and then, while the binder material is still tacky, covering the coated net with abrasive granules. The covering operation is conveniently performed by passing the coated net through a fluidized bed of the particles, cascading particles onto a coated net, or pressing the net into a mass of the particles. To further anchor the particles into the coating, a thin cover coat may be applied over the particles.

Figure 4:
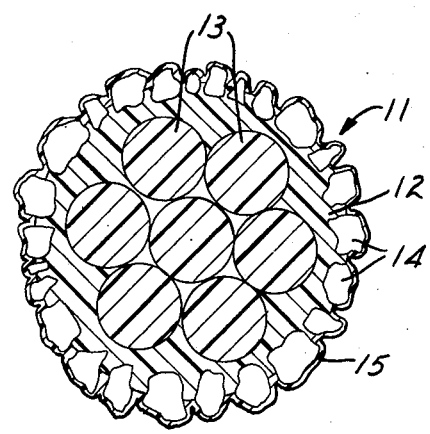
FIG. 4 is a greatly enlarged cross-sectional view through a strand of a traction mat of the invention.

A representative strand from the resulting mat is shown in greatly enlarged cross-section in FIG. 4. Binder material 12 encases the base strand which in this case comprises a plurality of filaments 13, and abrasive granules 14 are partially embedded in the binder material and partially "protrude" from the binder material. A thin cover coat 15 covers the abrasive granules. "Protrude" is used herein to describe both particles that extend above the main portion of a layer of binder material, even though a thin layer of binder material covers the particles, as well as particles in which the protruding portion is totally uncovered and exposed. "Strand" is used to include both structures that comprise a plurality of filaments or fibers as well as those that comprise a single filament or fiber; however, the strands preferably comprise a plurality of filaments, since binder material 11 will better impregnate and thus form a better bond to such a strand.

A preferred base net for use in a traction mat of the invention is an open-mesh, woven fabric made from strands of a synthetic organic polymeric fiber. Multifilament strands are typically interwoven into each other at crossover points to improve the connection between the crossing strands. Nylon is a preferred fiber in the base net since it is lightweight, strong and comparatively inexpensive. Natural fibers can also be used, but are less desirable because of lesser strength and resistance to deterioration.

The binder material coated onto the base net should be flexible and elastic, so that it is capable of stretching and returning to its original shape when the mat is used and wound into a roll; have good adhesion to the net and the abrasive granules; maintain its flexibility and other properties throughout a wide range of temperatures; have good toughness; and exhibit good resistance to weathering and to the various chemicals and the like that may be applied to a road. One such binder material comprises an epoxy resin and, as a curing agent for the epoxy resin, a polymer having a high amine functionality. Desirably the polymers have a molecular weight of at least 2,000 and preferably 5,000 and at least about 90 percent of the terminal groups are primary or secondary amino groups. One especially useful polyamine is the polyether polyamine taught in Hubin et al, U.S. Pat. No. 3,436,359. Other useful polyamines of high functionality can be made by methods taught in British Pat. No. 1,120,304 and U.S. Pat. No. 3,824,197. Another useful polyamine is the amine-terminated acrylonitrilebutadiene polymer marketed by B. F. Goodrich Chemicals under the tradename "Hycar" ATBN.

Useful abrasive granules include manufactured inorganic particles such as aluminum oxide and silicon carbide; naturally occuring particles, such as corundum, emery, garnet, quartzite, or silicon dioxide; and metallic particles. The size of the abrasive granules used varies with the purpose or function of the traction mat, but generally the particles average between about 400 and 2500 micrometers, and preferably between about 500 and 1500 micrometers, in diameter.

Traction mats of the invention are particularly useful under the wheels of a vehicle, but they may be used in many other ways, for example, as mats laid across icy doorsteps or sidewalks or across various slippery industrial surfaces. Mats of the invention can also be adhered to conveyor belts to refurbish them or improve their gripping power. For best handling, as previously indicated, the mat is flexible and can be rolled or wound into a roll, even in a tight roll around a mandrel having a diameter of as small as 5 millimeters.

The invention will be further illustrated by the following example. A solution of binder material was prepared from the following ingredients:

| | Parts by Weight |
|---|---|
| Poly(tetramethyleneoxide) diamine having a molecular weight of 10,000–12,000, an amine equivalent weight of about 4600, and a viscosity at 65° C of 49,500 centipoises prepared according to the procedures of Examples 1–4 of Hubin et al U.S. Pat. 3,436,359 | 146.8 |
| Diglycidylether of bisphenol A having an epoxide equivalent weight of 180–195 (Epon 828) | 55.0 |
| 2,4,6-tris-dimethylaminomethylphenol catalyst (DMP-30) | 5.1 |
| Gamma-mercaptopropyltrimethoxy silane | 0.1 |
| Soybean oil epoxide plasticizer (Paraplex G62 supplied by Rohm & Haas) | 33.4 |
| Carbon black (Thermax MT) | 29.4 |
| Silica (Cab-O-Sil H5) | 18.4 |
| Toluene | 111.9 |

A net of nylon strands each about 1 millimeter thick (more flat than round) woven with square openings about 1.6 centimeter on a side (Style 9470 supplied by Fablok Mills) was dipped into the solution of binder material to apply about 66 grams/sq. meter of the solids binder material. While the coating was still wet, the net was pulled through a fluidized bed of abrasive quartz granules (No. 4 Wausau Quartz) having a size range of about 700–1200 micrometers. The mineral-coating net was then passed through an oven heated to 150° C for about 10 minutes to react the binder material. Thereupon the net was dipped into a portion of the solution of binder material that had been further diluted by adding about 50 weight-percent solvent to apply about 44 grams/sq. meter dry weight of binder material. The coated net was then passed through an oven heated to 150° C for about 10 minutes to react the binder material and form a cover coat. Sections 9 inches by 36 inches were cut from the resulting net to form traction mats useful under vehicle tires on slippery streets.

What is claimed is:

1. A flexible traction mat capable of being wound into a small-diameter storage roll around a 5-millimeter-diameter mandrel without damage comprising an open-mesh net of strands that are encased around their individual circumferences with a frictional coating that comprises a layer of flexible elastic binder material adhered to the strands and a dense monolayer of abrasive granules partially embedded in, and partially protruding out of, the binder material so as to frictionally engage a surface against which the mat is laid, the area of the openings in the mat averaging at least 50 square millimeters, whereby the mat may be repeatedly used between an icy street surface and the wheels of a vehicle to increase the traction of the wheels.

2. A mat of claim 1 in which said binder material comprises epoxy resin.

3. A mat of claim 2 in which said binder material further includes a polymer having high amine functionality.

4. A mat of claim 1 in which the openings in the mat average at least 100 square millimeters.

5. A mat of claim 1 in which said strands comprise synthetic organic polymeric fibers.

6. A mat of claim 1 in which the average diameter of said abrasive granules is between about 400 and 2500 micrometers.

7. A flexible traction mat capable of being wound without damage into a compact storage roll around a 5-millimeter-diameter mandrel comprising an open-mesh net of strands that are encased around their individual circumferences with a frictional coating that comprises a layer of flexible elastic binder material adhered to the strands and a dense monolayer of abrasive granules partially embedded in, and partially protruding out of, the binder material so as to frictionally engage a surface against which the mat is laid, said binder material comprising an epoxy resin and a polymer having high amine functionality, and the area of the openings in the mat averaging at least 100 square millimeters, whereby the mat may be repeatedly used between an icy street surface and the wheels of a vehicle to increase the traction of the wheels.

8. A method for facilitating movement of a vehicle on a slippery surface comprising a) placing under one or more wheels of the vehicle a flexible traction mat that comprises an open-mesh net of strands that are encased around their individual circumferences with a frictional coating that comprises a layer of flexible elastic binder material adhered to the strands and a dense monolayer of abrasive granules partially embedded in, and partially protruding out of, the binder material so as to frictionally engage a surface against which the mat is laid, and then b) initiating movement of the vehicle.

* * * * *